United States Patent
Yang

(10) Patent No.: US 9,584,572 B2
(45) Date of Patent: Feb. 28, 2017

(54) CLOUD SERVICE DEVICE, MULTI-IMAGE PREVIEW METHOD AND CLOUD SERVICE SYSTEM

(71) Applicant: HON HAI PRECISION INDUSTRY CO., LTD., New Taipei (TW)

(72) Inventor: Kai-Yu Yang, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 476 days.

(21) Appl. No.: 14/149,825

(22) Filed: Jan. 8, 2014

(65) Prior Publication Data

US 2014/0289310 A1    Sep. 25, 2014

(30) Foreign Application Priority Data

Mar. 19, 2013  (TW) .............................. 102109569 A

(51) Int. Cl.
G06F 15/16      (2006.01)
G06F 15/173     (2006.01)
H04L 29/06      (2006.01)

(52) U.S. Cl.
CPC ........ H04L 65/602 (2013.01); H04L 65/4084 (2013.01)

(58) Field of Classification Search
CPC .............. H04L 65/602; H04L 65/4084; H04L 2209/56; H04L 2209/603; H04L 9/0825; H04L 9/3271
USPC ........................................ 709/203, 246, 238
See application file for complete search history.

(56) References Cited

U.S. PATENT DOCUMENTS

| | | | | |
|---|---|---|---|---|
| 2002/0166122 | A1* | 11/2002 | Kikinis | .............. H04N 5/44543 725/56 |
| 2008/0137756 | A1 | 6/2008 | Scherlis | |
| 2010/0259645 | A1* | 10/2010 | Kaplan | ................ G11B 27/034 348/231.99 |
| 2012/0328265 | A1* | 12/2012 | Sakuragi | .............. G11B 27/105 386/278 |
| 2014/0289629 | A1* | 9/2014 | Rossmann | .......... G06F 3/04883 715/722 |

FOREIGN PATENT DOCUMENTS

| | | |
|---|---|---|
| CN | 101836440 A | 9/2010 |
| CN | 101957752   | 1/2011 |
| CN | 101957752 A | 1/2011 |
| CN | 102547374 A | 7/2012 |
| CN | 102769791 A | 11/2012 |
| CN | 102932679 A | 2/2013 |
| TW | 201145981 A1 | 12/2011 |

\* cited by examiner

Primary Examiner — Farzana Huq
(74) Attorney, Agent, or Firm — Zhigang Ma

(57) ABSTRACT

A cloud service device includes a data center that stores video preview images. A first message requesting previewing multiple images from is received from a multimedia device. Multiple offsets corresponding to the multiple images according to the first time interval and the first image number are calculated and time points corresponding to the multiple images according to the multiple offsets and the first preview time point are calculated. The multiple images from the data center according to the calculated time points are obtained and transmitted to the multimedia device to preview.

18 Claims, 5 Drawing Sheets

A First Images Number n=7

CLOUD SERVICE DEVICE, MULTI-IMAGE PREVIEW METHOD AND CLOUD SERVICE SYSTEM

BACKGROUND

1. Technical Field

The disclosure relates to network communications, and particularly to a cloud service device, a multiple image preview method, and a cloud service system.

2. Description of Related Art

With the computer technology development, Internet video becomes a main stream, and users can preview images of video before the video played. However, the existing technology only can achieve the function of a single image previewing, but can not achieve the function of multi-image preview in video, which is poor experience to the users.

It is a big research subject to achieve the function of multi-image preview when playing video.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean "at least one."

The word "module" as used hereinafter, refers to logic embodied in hardware or firmware, or to a collection of software instructions, written in a programming language, such as, for example, JAVA, C, or assembly. One or more software instructions in the modules may be embedded in firmware such as in an EPROM. It will be appreciated that modules may comprise connected logic units, such as gates and flip-flops, and may comprise programmable units, such as programmable gate arrays or processors. The modules described herein may be implemented as either software and/or hardware modules and may be stored in any type of computer-readable medium or other computer storage device.

Figure 1:
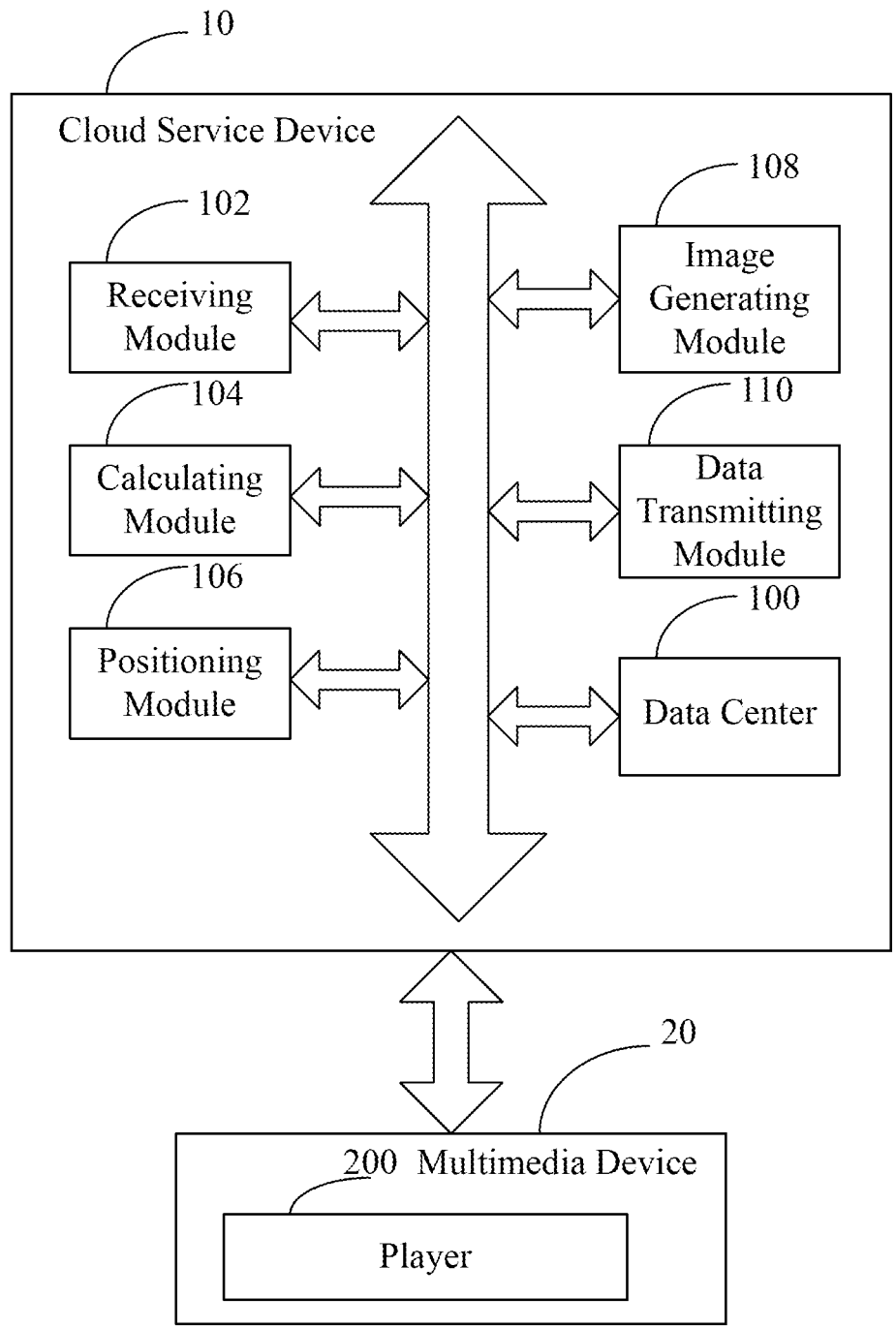
FIG. 1 is an application environment and function module diagram of one embodiment of a cloud service device as disclosed.

FIG. 1 is an application environment and function module diagram of one embodiment of a cloud service device 10. In one embodiment, the cloud service device 10 includes many function modules, when a user needs to preview multiple images, a multimedia device 20 will transmit messages to the cloud service device 10 requesting previewing multiple images. After the cloud service device receives the messages, the function modules of the cloud service device 10 handle the message and provide multiple images for the user so that a player 200 of the multimedia device 20 can play the multiple images.

If an user needs to preview multiple images when the user watch an Internet video, the multimedia device 20 will transmit a first message to the cloud service device 10 requesting previewing multiple images. In one embodiment, when the user moves mouse to a point of playback bar, which can make the multimedia device 20 transmit the first message to the cloud service device 10 requesting previewing multiple images. In one embodiment, the first message comprises a first preview time point, a first time interval and a first image number. Generally, the first preview time point is the time point that the user move mouse to a time point of playback bar, and the time point of playback bar is different from the time point when the video is playing . The first time interval is a time interval between two adjacent images, which is set in the multimedia device 20 by the user based on personal preferences, such as five seconds. The first image number is a number of the multiple images, which is also set in the multimedia device 20 by the user based on personal preferences, such as seven images.

In one embodiment, the cloud service device 10 comprises a data center 100, a receiving module 102, a calculating module 104, a positioning module 106, an image generating module 108 and a data transmitting module 110. The data center 100 stores video data streams when the users watch video, and the video data streams comprises a large number of video images , and every video image corresponds to a video preview time point, and the video preview time point is a time interval between current video preview time point and video starting time point.

In one embodiment, the receiving module 102 receives the first message requesting previewing multiple images from the multimedia device 20, then the calculating module 104 calculates multiple offsets corresponding to the multiple images according to the first time interval and the first image number. Next, the positioning module 106 calculates time points corresponding to the multiple images according to the multiple offsets and the first preview time point, and the image generating module 108 obtains the multiple images from the data center 100 according to the calculated time points. Then, the data transmitting module 110 transmits the obtained multiple images to the multimedia device 20 to preview. Generally, the image generating module 108 obtaining the multiple images from the data center 100 according to the calculated time points, and the multiple images have to be compressed to a file. When the file is transmitted to the multimedia device 20, the multimedia device 20 needs to decompress the file to the multiple images to preview.

Figure 2:
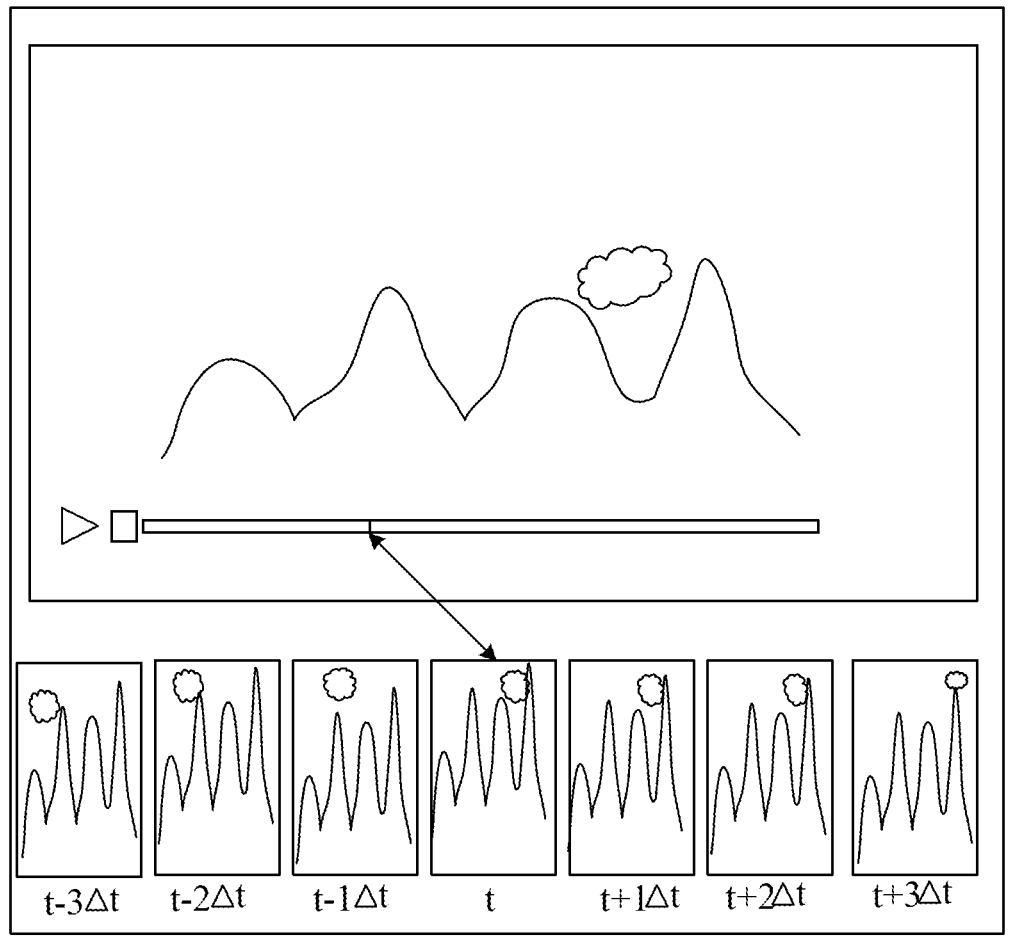
FIG. 2 is a computational method diagram of calculating multiple offsets of one embodiment of the cloud service device of FIG. 1.

FIG. 2 is a computational method diagram of calculating multiple offsets of one embodiment of the cloud service device of FIG. 1. In one embodiment, an example can be used for stating the computational method.

At first, in this example, the first preview time point(t) received by the receiving module 102 is 10 minutes and 30 seconds, and the time interval(Δt) set by the users is 5 seconds, the first image number is 7. The offsets of the multiple images is the first time interval*n, and the n indicates a serial of indexes corresponding to the multiple images, the index of an image corresponding to the first preview time point is 0, the indexes of images which are in front of the image corresponding to the first preview time point are negative integers increasing in sequence, and the indexes of images which are behind the image corresponding to the first preview time point are positive integers increasing in sequence. So, in this example, when the first preview time point is referred as a center point, preview images can be watched every 5 seconds. Because the time points of the multiple images is the first preview time point+the offsets of the multiple images, the calculating module 104 can calculate the indexes of multiple offsets corresponding to the multiple images are −3, −2, −1,0,1,2 and 3 in proper order, and the positioning module 106 can also calculate the time points corresponding to the multiple images are 10 minutes and 15 seconds, 10 minutes and 20 seconds, 10 minutes and 25 seconds, 10 minutes and 30 seconds, 10 minutes and 35 seconds, 10 minutes and 40 seconds and 10 minutes and 45 seconds. After the positioning module 106 calculates the time points corresponding to the multiple images, and the image generating module 108 obtain the multiple images from the data center 100 according to the calculated time points. So, the data transmitting module 110 transmits the obtained multiple images to the multimedia device 20 to preview.

As the further improvement of the present disclosure when the user needs to preview more subtle among any these preview images have been obtained, the user can move the mouse from a starting time point to an ending time point, which will result in the multimedia device 20 transmitting a second message requesting previewing multiple to the cloud service device 10. In another embodiment, the user also can make the multimedia device 20 transmit the second message requesting previewing multiple to the cloud service device 10 by the other method.

In one embodiment, the receiving module 102 of the cloud service device 10 receives the second message, and the second message comprises an expand starting time point, an expand ending time point and a second image number. Referring to all of the parameters above, the calculating module 104 can calculate an offset of expand images. the expand starting time point is a starting time point of expand images, and the expand ending time point is a ending time point of the expand images, and the second image number is the number of the expand images, and the offset of expand images is a time difference between two adjacent expand images. Generally, the second image number is set by the user according to personal need in the multimedia device 20, such as 6.

Figure 3:
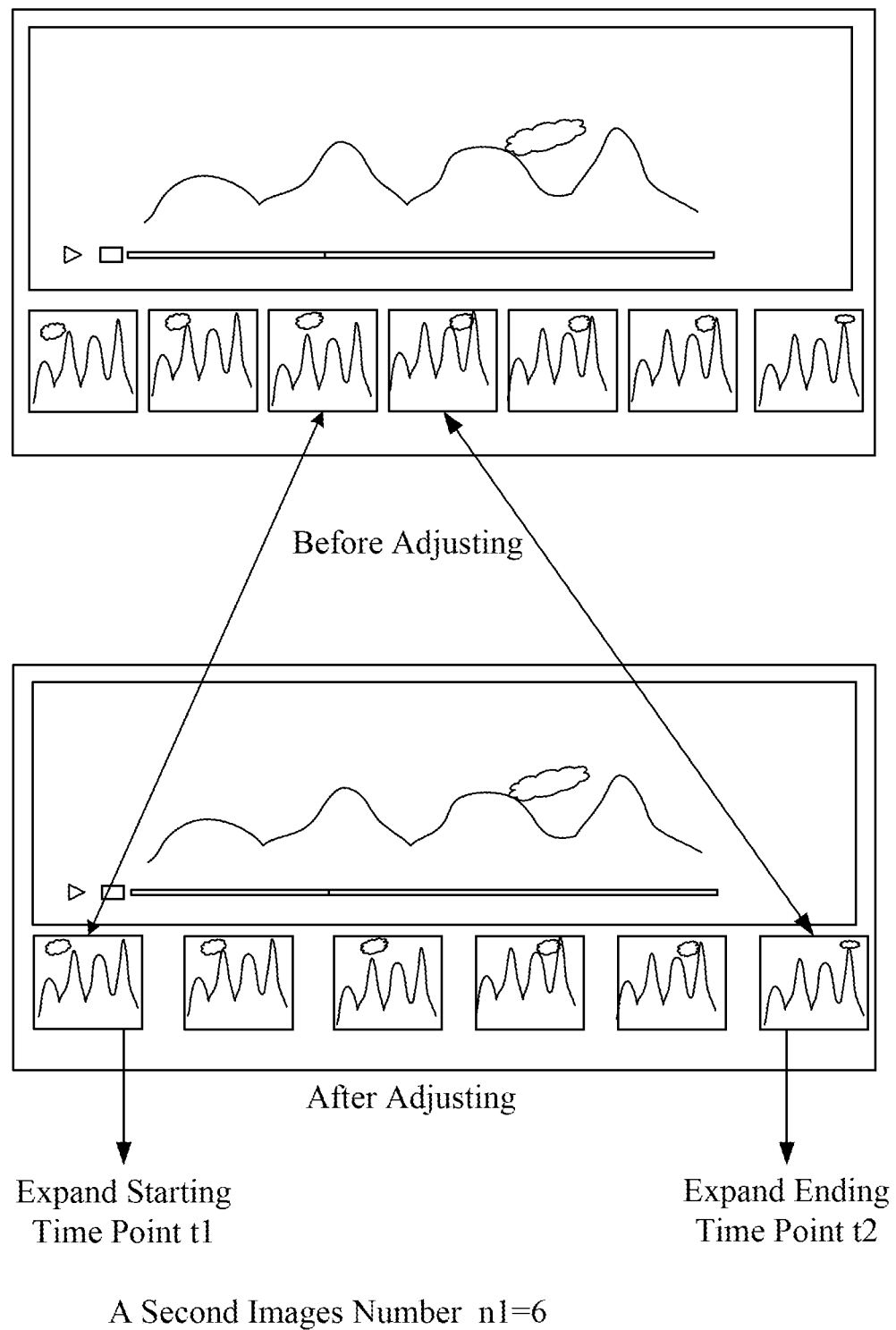
FIG. 3 is a computational method diagram of calculating multiple offsets of another embodiment of the cloud service device of FIG. 1.

FIG. 3 is a computational method diagram of calculating multiple offsets of another embodiment of the cloud service device of FIG. 1. In one embodiment, the offset of the expand images is (the expand ending time point−the expand starting time point)/(the second image number−1). If the expand starting time point is t1, the expand ending time point is t2 and the second image number is n1. So, the offset of the expand images is (t2−t1)/(n1−1), in other words, the time difference between two adjacent expand images is (t2−t1)/(n1−1). So, all of the time points corresponding to all the preview images can be calculated based on the expand starting time point t1 and the offset of the expand images (t2−t1)/(n1−1).

In this example, the expand starting time point t1 is 10 minutes and 20 seconds, the expand ending time point t2 is 10 minutes and 25 seconds, the second image number n1 is 6, it can be easily calculated that the offset of the expand images (t2−t1)/(n1−1) is 1 second. So, the following time points are 10 minutes and 20 seconds, 10 minutes and 21 seconds, 10 minutes and 22 seconds, 10 minutes and 23 seconds, 10 minutes and 24 seconds, 10 minutes and 25 seconds. After these time points are found out, all of the preview images will be obtained from the data center 100.

Figure 4:
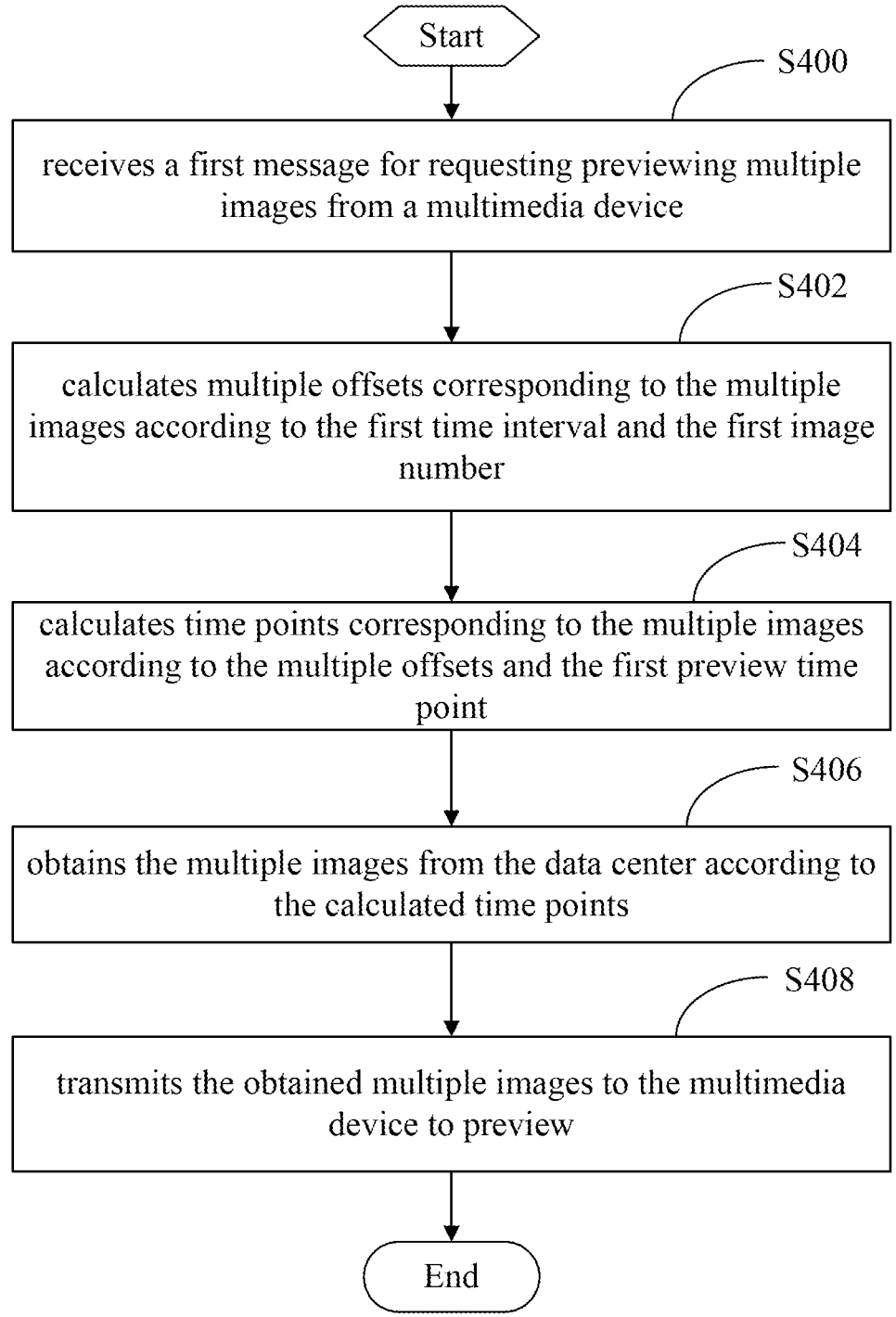
FIG. 4 is a general flowchart of one embodiment of a method of the cloud service device providing multi-image preview when playing video as disclosed.

FIG. 4 is a general flowchart of one embodiment of a method of the cloud service device providing multi-image preview when playing video as disclosed. The method is applied for the cloud service device 10, and achieved by the modules of the FIG. 1.

when users are watching Internet video, the users need to preview the following wonderful content, the users can move the mouse to suitable time point in the playback bar, so the multimedia device 20 transmits multiple preview requests to the cloud service device 10. A method of the cloud service device 10 providing multi-image preview when playing video will be introduced.

In step S400, the receiving module 102 receives a first message requesting previewing multiple images from a multimedia device. In one embodiment, the first message comprises a first preview time point, a first time interval, and a first image number. In general, the first preview time point is a time point requested by the multimedia device, the first time interval is a time interval between two adjacent images of the multiple images, and the first image number is a number of the multiple images.

In step S402, the calculating module 104 calculates multiple offsets corresponding to the multiple images according to the first time interval and the first image number, and the multiple offsets indicates time intervals between the multiple images and the first preview time point.

In step S404, the positioning module 106 calculates time points corresponding to the multiple images according to the multiple offsets and the first preview time point.

In step S406, the image generating module 108 obtains the multiple images from the data center according to the calculated time points. In general, the multiple images must be compressed to a single file.

In step S408, the data transmitting module 110 transmits the obtained multiple images to the multimedia device to preview.

Figure 5:
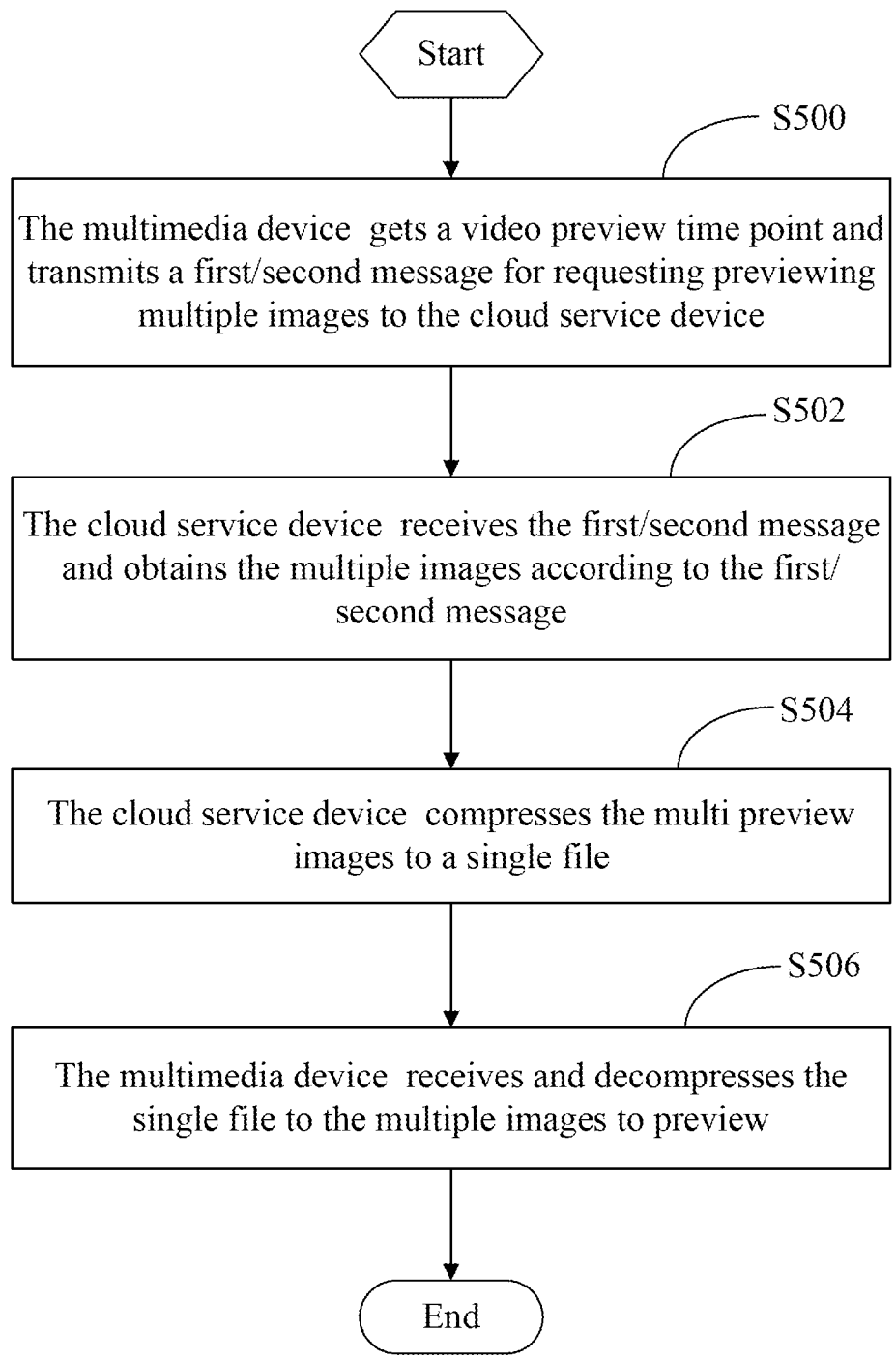
FIG. 5 is a general flowchart of one embodiment of a method of the cloud service system providing multi- image preview when playing video as disclose.

FIG. 5 is a general flowchart of one embodiment of a method of the cloud service system providing multi-image preview when playing video as disclosed. The method is applied for the cloud service device 10 and the multimedia device 20, and achieved by the cloud service device 10 and the multimedia device 20.

In step S500, the multimedia device 20 gets a video preview time point according to the locating position of the mouse moving on the playback bar, and transmits a first/second message requesting previewing multiple images to the cloud service device. the first message comprises a first preview time point, a first time interval, and a first image number, and the second message comprises an expand starting time point, an expand ending time point and a second image number.

In one embodiment, the video preview time point is the time point corresponding to the mouse moving to the video playback bar besides the video image a user watching. The first/second time interval is set in the multimedia device 20 according to the user own needs, such as 5 second. The first/second image number is also set in the multimedia device 20 according to the user own needs, such as 7.

In step S502, the cloud service device 10 receives the first/second message and obtains the multiple images according to the first/second message.

In step S504, the cloud service device 10 compresses the multiple images to a single file.

In step S506, the multimedia device 20 receives and decompresses the single file to the multiple images to preview.

According to all of the embodiment, the method of the cloud service device 10 provides multi-image previews when playing video and improves preview experience for users.

The foregoing disclosure of the various embodiments has been presented for purposes of illustration and description. It is not intended to be exhaustive or to limit the present disclosure to the precise forms disclosed. Many variations and modifications of the embodiments described herein will be apparent to one of ordinary skill in the art in the light of the above disclosure. The scope of the present disclosure is to be defined only by the claims appended hereto and their equivalents.

What is claimed is:

1. A cloud service device comprising:
    a data center storing video preview images;
    a processor; and
    a storage system storing one or more software programs in form of computerized codes operable to be executed by the processor, the one or more software programs comprising:
        receiving a first message requesting previewing multiple images from a multimedia device, wherein the first message comprises a first preview time point, a first time interval, and a first image number, wherein the first preview time point is a time point requested by the multimedia device, the first time interval is a time interval between two adjacent images of the multiple images, and the first image number is a number of the multiple images, wherein both the first time interval and first image number are set in the multimedia device by a user;
        calculating multiple offsets corresponding to the multiple images according to the first time interval and the first image number, wherein the multiple offsets indicates time intervals between the multiple images and the first preview time point;
        calculating time points corresponding to the multiple images according to the multiple offsets and the first preview time point;
        obtaining the multiple images from the data center according to the calculated time points; and
        transmitting the obtained multiple images to the multimedia device to enable previewing of the multiple images by the multimedia device according to user settings.

2. The cloud service device of claim 1, wherein the offsets of the multiple images is the first time interval * n, wherein n indicates a serial of indexes corresponding to the multiple images, wherein the index of an image corresponding to the first preview time point is 0, the indexes of images which are in front of the image corresponding to the first preview time point are negative integers increasing in sequence, and the indexes of images which are behind the image corresponding to the first preview time point are positive integers increasing in sequence.

3. The cloud service device of claim 2, wherein the time points of the multiple images is the first preview time point+the offsets of the multiple images.

4. The cloud service device of claim 1, further comprising receiving a second message requesting previewing multiple images from the multimedia device, wherein the second message comprises an expand starting time point, an expand ending time point and a second image number, wherein the expand starting time point is a starting time point of expand images, the expand ending time point is a ending time point of the expand images, and the second image number is the number of the expand images.

5. The cloud service device of claim 4, further comprising calculating an offset of the expand images according to the expand starting time point, the expand ending time point and the second image number, wherein the offset of expand images is a time difference between two adjacent expand images.

6. The cloud service device of claim 5, wherein the offset of the expand images is (the expand ending time point−the expand starting time point)/(the second image number −1).

7. A multiple images previewing method of a cloud service device comprising:
    receiving a first message requesting previewing multiple images from a multimedia device, wherein the first message comprises a first preview time point, a first time interval, and a first image number, wherein the first preview time point is a time point requested by the multimedia device, the first time interval is a time interval between two adjacent images of the multiple images, and the first image number is a number of the multiple images, wherein both the first time interval and first image number are set in the multimedia device by a user;
    calculating multiple offsets corresponding to the multiple images according to the first time interval and the first image number, wherein the multiple offsets indicates time intervals between the multiple images and the first preview time point;
    calculating time points corresponding to the multiple images according to the multiple offsets and the first preview time point;
    obtaining the multiple images from the data center according to the calculated time points; and
    transmitting the obtained multiple images to the multimedia device to enable previewing of the multiple images by the multimedia device according to user settings.

8. The multiple images previewing method of a cloud service device of claim 7, wherein the offsets of the multiple images is the first time interval * n, wherein n indicates a serial of indexes corresponding to the multiple images, wherein the index of an image corresponding to the first preview time point is 0, the indexes of images which are in front of the image corresponding to the first preview time point are negative integers increasing in sequence, and the indexes of images which are behind the image corresponding to the first preview time point are positive integers increasing in sequence.

9. The multi images previewing method of a cloud service device of claim 8, wherein the time points of the multiple images is the first preview time point+the offsets of the multiple images.

10. The multi images previewing method of a cloud service device of claim 7, wherein the method further comprise:
    receiving a second message requesting previewing multiple images from the multimedia device, wherein the second message comprises an expand starting time point, an expand ending time point and a second image number, wherein the expand starting time point is a starting time point of expand images, the expand ending time point is a ending time point of the expand images, and the second image number is the number of the expand images;

calculating an offset of the expand images according to the expand starting time point, the expand ending time point and the second image number, wherein the offset of expand images is a time difference between two adjacent expand images.

11. The multi images previewing method of a cloud service device of claim 10, wherein the offset of the expand images is (the expand ending time point−the expand starting time point)/(the second image number −1).

12. A cloud service system comprising:
a cloud service device and a multimedia device transmitting a first message requesting previewing multiple images to the cloud service device, and receiving the multiple images from the cloud service device to preview, the cloud service device comprising:
  a data center, storing video preview images;
  a processor; and
  a storage system, storing one or more software programs in a form of computerized codes operable to be executed by the processor, the one or more software programs comprising:
    receiving a first message for requesting previewing multiple images from a multimedia device, wherein the first message comprises a first preview time point, a first time interval, and a first image number, wherein the first preview time point is a time point requested by the multimedia device, the first time interval is a time interval between two adjacent images of the multiple images, and the first image number is a number of the multiple images, wherein both the first time interval and first image number are set in the multimedia device by a user;
    calculating multiple offsets corresponding to the multiple images according to the first time interval and the first image number, wherein the multiple offsets indicates time intervals between the multiple images and the first preview time point;
    calculating time points corresponding to the multiple images according to the multiple offsets and the first preview time point;
    obtaining the multiple images from the data center according to the calculated time points; and
    transmitting the obtained multiple images to the multimedia device to enable previewing of the multiple images by the multimedia device according to user settings.

13. The cloud service system of claim 12, wherein the multimedia device transmitting a second message requesting previewing multiple images to the cloud service device, and transmitting a first message requesting previewing multiple images to the cloud service device, and receiving the multiple images from the cloud service device to preview.

14. The cloud service system of claim 12, wherein the offsets of the multiple images is the first time interval * n, wherein n indicates a serial of indexes corresponding to the multiple images, wherein the index of an image corresponding to the first preview time point is 0, the indexes of images which are in front of the image corresponding to the first preview time point are negative integers increasing in sequence, and the indexes of images which are behind the image corresponding to the first preview time point are positive integers increasing in sequence.

15. The cloud service system of claim 14, wherein the time points of the multiple images is the first preview time point+the offsets of the multiple images.

16. The cloud service system of claim 12, further comprising receiving a second message requesting previewing multiple images from the multimedia device, wherein the second message comprises an expand starting time point, an expand ending time point and a second image number, wherein the expand starting time point is a starting time point of expand images, the expand ending time point is a ending time point of the expand images, and the second image number is the number of the expand images.

17. The cloud service system of claim 16, wherein further comprising calculating an offset of the expand images according to the expand starting time point, the expand ending time point, and the second image number, wherein the offset of expand images is a time difference between two adjacent expand images.

18. The cloud service system of claim 17, wherein the offset of the expand images is (the expand ending time point −the expand starting time point)/(the second image number −1).

* * * * *